US012738000B2

(12) United States Patent
Xu et al.

(10) Patent No.: US 12,738,000 B2
(45) Date of Patent: Sep. 15, 2026

(54) THREE DIMENSIONAL AWARE VIDEO COMPOSITING

(71) Applicant: Adobe Inc., San Jose, CA (US)

(72) Inventors: Zhan Xu, San Jose, CA (US); Kim P. Pimmel, San Francisco, CA (US); Jimei Yang, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 143 days.

(21) Appl. No.: 18/623,377

(22) Filed: Apr. 1, 2024

(65) Prior Publication Data

US 2025/0308184 A1 Oct. 2, 2025

(51) Int. Cl.

| | |
|---|---|
| ***G06T 19/20*** | (2011.01) |
| ***G06T 7/11*** | (2017.01) |
| ***G06T 7/215*** | (2017.01) |
| ***G06T 7/579*** | (2017.01) |
| ***G06T 15/20*** | (2011.01) |

(52) U.S. Cl.

CPC ................ *G06T 19/20* (2013.01); *G06T 7/11* (2017.01); *G06T 7/215* (2017.01); *G06T 7/579* (2017.01); *G06T 15/20* (2013.01); *G06T 2200/04* (2013.01); *G06T 2207/10016* (2013.01); *G06T 2207/10024* (2013.01); *G06T 2207/10028* (2013.01); *G06T 2207/20081* (2013.01); *G06T 2207/20084* (2013.01); *G06T 2207/20212* (2013.01); *G06T 2207/30241* (2013.01); *G06T 2210/56* (2013.01); *G06T 2219/2004* (2013.01); *G06T 2219/2012* (2013.01)

(58) Field of Classification Search

CPC .......... G06T 19/20; G06T 7/215; G06T 7/579

USPC .......................................................... 345/419

See application file for complete search history.

(56) References Cited

U.S. PATENT DOCUMENTS

| | | | | |
|---|---|---|---|---|
| 2016/0037148 | A1* | 2/2016 | Jobe | H04N 9/3185 348/745 |
| 2019/0215486 | A1* | 7/2019 | Venshtain | G06T 15/205 |
| 2023/0386147 | A1* | 11/2023 | Holmes | G06V 20/46 |
| 2025/0148678 | A1* | 5/2025 | Ranjan | G06T 13/40 |

OTHER PUBLICATIONS

Vachha, Cyrus, "Creating Visual Effects with Neural Radiance Fields", Dec. 2023, 2 pages (Year: 2023).*

Barron, et al., "Mip-nerf 360: Unbounded anti-aliased neural radiance fields", Cornell University, arXiv.org, arXiv:2111.12077v2, Nov. 24, 2021, 17 pages.

(Continued)

*Primary Examiner* — Thomas J Lett

(74) *Attorney, Agent, or Firm* — FIG. 1 Patents

(57) ABSTRACT

Three dimensional aware video compositing techniques are described. In one or more examples, subject data is produced that defines a subject depicted in frames of a subject video and viewpoint data describing movement of a viewpoint with respect to the frames of the subject video. Three-dimensional data is formed that defines a three-dimensional representation of an environment depicted in frames of an environment video. A composited video is generated by aligning the environment with the movement of the viewpoint of the subject based on the subject data and the three-dimensional data, which is then rendered, e.g., presented for display in a user interface.

20 Claims, 8 Drawing Sheets

(56) References Cited

OTHER PUBLICATIONS

Chen, et al., “Dictionary fields: Learning a neural basis decomposition”, ACM Transactions on Graphics, 2023, 12 pages.
CINE 24 VFX, “chroma key after effects—Perfect green screen in 5 minutes”, YouTube video uploaded Nov. 1, 2018 by user “CINE 24 VFX” [retrieved Jul. 1, 2024]. Retrieved from the Internet <https://www.youtube.com/watch?v=VA2yvv_JLIE>, Nov. 1, 2018, 3 pages.
Gower, J.C., “Generalized Procrustes Analysis”, Psychometrika, vol. 40, No. 1, Mar. 1975, 19 pages.
Ke, et al., “Harmonizer: Learning to perform white-box image and video harmonization”, ECCV, 2022, 17 pages.
Lee, et al., “Inserting videos into videos”, Cornell University, arXiv.org, arXiv:1903.06571v1, Mar. 15, 2019, 14 pages.
Luo, et al., “Consistent Video Depth Estimation”, Cornell University arXiv, arXiv.org [retrieved Jul. 1, 2024]. Retrieved from the Internet <https://https://arxiv.org/pdf/2004.15021>., Aug. 26, 2020, 13 pages.
Mildenhall, Ben, et al., “NeRF in the Dark: High Dynamic Range View Synthesis from Noisy Raw Images”, Cornell University arXiv, arXiv.org [retrieved Oct. 5, 2022]. Retrieved from the Internet <https://arxiv.org/pdf/2111.13679.pdf>., Nov. 26, 2021, 18 Pages.
Niklaus, “3d ken burns effect from a single image”, Cornell University arXiv, arXiv.org [retrieved Jul. 1, 2024]. Retrieved from the Internet <https://arxiv.org/pdf/1909.05483>., Sep. 12, 2019, 15 pages.
Oh, Seoung Wug, et al., “Video Object Segmentation Using Space-Time Memory Networks”, Cornell University arXiv, arXiv.org [retrieved Feb. 14, 2022]. Retrieved from the Internet <https://arxiv.org/pdf/1904.00607.pdf>., Aug. 12, 2019, 10 Pages.
Saito, “Pifu: Pixel-aligned implicit function for high-resolution clothed human digitization”, Cornell University arXiv, arXiv.org [retrieved Jul. 1, 2024]. Retrieved from the Internet <https://arxiv.org/pdf/1905.05172>., Dec. 3, 2019, 15 pages.
Teed, et al., “Droid-slam: Deep visual slam for monocular, stereo, and rgb-d cameras”, 35th Conference on Neural Information Processing Systems (NeurIPS), 2021, 12 pages.
Tsai, et al., “Deep Image Harmonization”, Cornell University arXiv, arXiv.org [retrieved Jul. 1, 2024]. Retrieved from the Internet <https://arxiv.org/pdf/1703.00069>., Feb. 28, 2017, 9 pages.
Wang, et al., “People as Scene Probes”, Cornell University arXiv, arXiv.org [retrieved Jul. 1, 2024]. Retrieved from the Internet <https://arxiv.org/pdf/2007.09209>., Jul. 17, 2020, 24 pages.
Zhang, et al., “NeRF++: Analyzing and Improving Neural Radiance Fields”, Cornell University arXiv, arXiv.org [retrieved Jul. 1, 2024]. Retrieved from the Internet <https://arxiv.org/abs/2010.07492>., Oct. 21, 2020, 9 pages.
Zhang, “Structure and Motion from Casual Videos”, ECCV, 2022, 16 pages.
Zhao, et al., “ParticleSfM: Exploiting Dense Point Trajectories for Localizing Moving Cameras in the Wild”, Cornell University arXiv, arXiv.org [retrieved Jul. 1, 2024]. Retrieved from the Internet </https://arxiv.org/pdf/2207.09137>., Jul. 19, 2022, 25 pages.

* cited by examiner

THREE DIMENSIONAL AWARE VIDEO COMPOSITING

BACKGROUND

Video compositing is utilized to combine features from multiple videos as part of forming a composite video. Conventional techniques to perform video compositing, however, encounter numerous technical challenges that limit applicability to particular scenarios. Conventional techniques used in an attempt to overcome these conventional limitations involve numerous manual interactions as part of a back-and-forth process. These conventional limitations result in increased computational resource consumption, reduced user interaction efficiency, increased power consumption, and limited accuracy causing visual artifacts that are readily viewable by a user.

SUMMARY

Three dimensional aware video compositing techniques are described. In one or more examples, subject data is produced that defines a subject depicted in frames of a subject video and viewpoint data describing movement of a viewpoint with respect to the frames of the subject video. Three-dimensional data is formed that defines a three-dimensional representation of an environment depicted in frames of an environment video. A composited video is generated by aligning the environment with the movement of the viewpoint of the subject based on the subject data and the three-dimensional data, which is then rendered, e.g., presented for display in a user interface.

This Summary introduces a selection of concepts in a simplified form that are further described below in the Detailed Description. As such, this Summary is not intended to identify essential features of the claimed subject matter, nor is it intended to be used as an aid in determining the scope of the claimed subject matter.

BRIEF DESCRIPTION OF THE DRA WINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
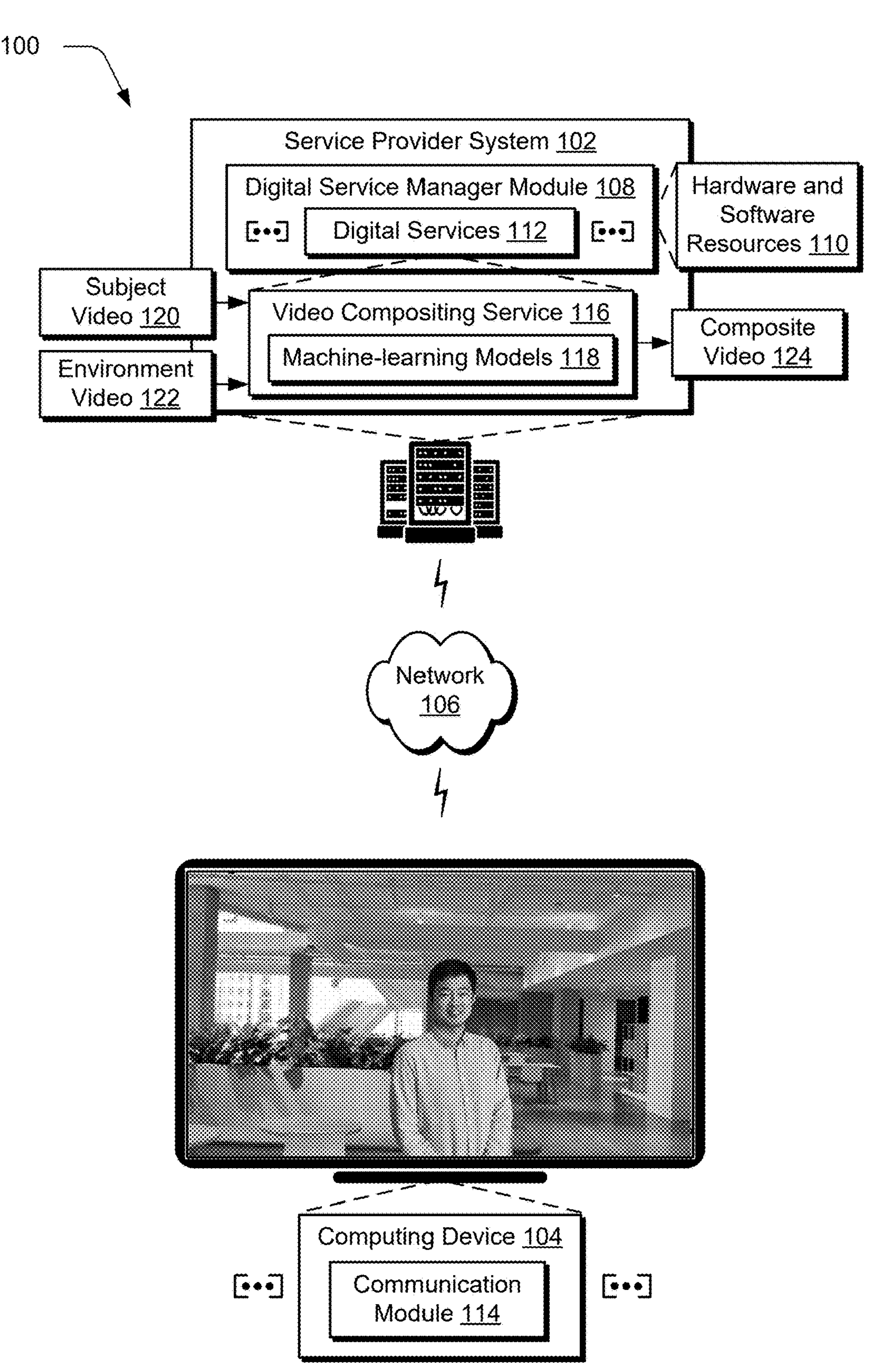
FIG. 1 is an illustration of a digital medium environment in an example implementation that is operable to employ three dimensional aware video compositing techniques as described herein.

Video compositing is utilized to combine features from multiple videos as part of forming a composite video. A subject video, for instance, may include a subject and an environment video is usable to define an environment, in which, the subject is to be disposed as part of a composite video. Conventional techniques to perform video compositing, however, encounter numerous technical challenges that limit applicability to particular scenarios.

Conventional techniques, for instance, typically assume that a subject in a subject video is stationary such that movement of a viewpoint of the subject remains static. Accordingly, conventional techniques do not support movement of the subject when composited with an environment video. In other words, conventional techniques do not support free camera movement in video compositing. Conventional techniques to address these technical challenges typically involve manual synchronization as part of capturing the subject video and capturing the environment video to have corresponding movement, which is prone to error, results in visual artifacts, and increased computational resource consumption as part of a back-and-forth process.

Accordingly, video compositing techniques are described as implemented by a video compositing service that leverage three-dimensional awareness to address these and other technical challenges. A subject video, for instance, is usable to capture a subject of a composite video. An environment video, on the other hand, is used to capture an environment for the composite video. The video compositing service is configurable to extract motion of viewpoints (i.e., camera motion) from the subject video, and use this motion as part of generating the composite video in an environment defined by the environment video. By doing so, a subject layer and an environment layer of the composite video exhibit synchronized motion of viewpoints used to view the subject and the environment, which is not possible in conventional techniques.

To do so in one or more examples, the video compositing service receives the subject video and the environment video. Although implementation of the video compositing service is described as part of a digital service, other local execution examples are also contemplated. The video compositing service segments a subject from frames of the source video, e.g., as masks. The video compositing service is also configured to generate viewpoint data describing a viewpoint (e.g., camera position) of the subject with respect to respective frames of the source video. The viewpoint data, for instance, is configurable to define trajectory data describing movement of a viewpoint (e.g., camera) as depth data describing depth of a subject in respective frames.

The video compositing service is also configurable to process an environment video describing an environment, in which, the subject is to be composited. In order to process the environment video, the video compositing service is configured to generate three-dimensional data as a three-dimensional representation of an environment depicted in the environment video, e.g., from two-dimensional frames of the video.

In one or more examples, the three-dimensional representation is configured as a neural radiance field. A neural radiance field is a technique that leverages machine learning (e.g., deep learning) for constructing a three-dimensional representation of an environment from two-dimensional images using a neural network. The neural radiance field supports generation of previously unseen views of the environment (i.e., that are not explicitly included in the environment video) using the neural network as trained based on the two-dimensional images from frames of the environment video. The video compositing service, as part of processing the environment video, is also configurable to generate environment data describing additional parameters of the environment, such as per-frame camera parameters, a point cloud, and so forth.

The video compositing service then aligns the three-dimensional representation of the environment from the environment video (e.g., as defined by the neural radiance field) with respect to a three-dimensional environment of the subject video. A point cloud of the three-dimensional representation of the environment of the environment video, for example, is aligned based on viewpoint data (e.g., depth data) taken from the subject video.

Once aligned, the video compositing service generates a composite video based on the source video (e.g., the subject data and the viewpoint data) and the environment video, e.g., the three-dimensional representation as the neural radiance field and the environment data. As part of generating the composite video, movement of a viewpoint of the subject is aligned with movement of an environment rendered based on the three-dimensional representation. The video compositing service, for instance, follows movement of the subject as defined in the subject video and generates a background using the three-dimensional representation. Generation of the background may include "new" views of the environment that are not included in the environment video but rather are generated using machine learning, e.g., generative artificial intelligence.

In this way, the video compositing service supports free camera movement in video compositing, improved visual accuracy, and reduced computational resource consumption that is not possible in conventional techniques. Further discussion of these and other examples is included in the following figures and shown in corresponding figures.

In the following discussion, an example environment is described that employs the techniques described herein. Example procedures are also described that are performable in the example environment as well as other environments. Consequently, performance of the example procedures is not limited to the example environment and the example environment is not limited to performance of the example procedures.

Example Video Compositing Environment

FIG. 1 is an illustration of a digital medium environment 100 in an example implementation that is operable to employ three dimensional aware video compositing techniques as described herein. The illustrated environment 100 includes a service provider system 102 and a computing device 104 that are communicatively coupled, one to another, via a network 106. Computing devices are configurable in a variety of ways.

A computing device, for instance, is configurable as a desktop computer, a laptop computer, a mobile device (e.g., assuming a handheld configuration such as a tablet or mobile phone), and so forth. Thus, a computing device ranges from full resource devices with substantial memory and processor resources (e.g., personal computers, game consoles) to a low-resource device with limited memory and/or processing resources (e.g., mobile devices). Additionally, although a single computing device is shown and described in instances in the following discussion, a computing device is also representative of a plurality of different devices, such as multiple servers utilized by a business to perform operations "over the cloud" for the service provider system 102 and as further described in relation to FIG. 8.

The service provider system 102 includes a digital service manager module 108 that is implemented using hardware and software resources 110 (e.g., a processing device and computer-readable storage medium) in support of one or more digital services 112. Digital services 112 are made available, remotely, via the network 106 to computing devices, e.g., computing device 104. Digital services 112 are scalable through implementation by the hardware and software resources 110 and support a variety of functionalities, including accessibility, verification, real-time processing, analytics, load balancing, and so forth. Examples of digital services include a social media service, streaming service, digital content repository service, content collaboration service, and so on. Accordingly, in the illustrated example, a communication module 114 (e.g., browser, network-enabled application, and so on) is utilized by the computing device 104 to access the one or more digital services 112 via the network 106. A result of processing using the digital services 112 is then returned to the computing device 104 via the network 106.

In the illustrated example, the digital services 112 are utilized to implement a video compositing service 116 that is configurable to employ one or more machine-learning models 118 to process a subject video 120 and an environment video 122 to generate a composite video 124. For example, given a subject video 120 "Vr" capturing a foreground subject with a free-moving camera and the environment video 122 "$V_b$" capturing an environment, the video compositing service 116 is tasked with generating the composite video 124 as compositing a subject from the subject video 120 "$V_f$" with the environment from the environment video 122 "$V_b$." Visually, the video compositing service 116 swaps an original background in the subject video 120 "$V_f$" with the environment captured by the environment video 122 "$V_b$" in a realistic and plausible manner as part of generating the composite video 124.

As previously described, conventional video compositing techniques assume a subject is captured by a stationary camera. In the techniques described herein, however, no prior constraint is placed on motion of a viewpoint (i.e., the camera motion) capturing the subject video 120 "$V_f$." The video compositing service 116, for instance, synchronizes motion of viewpoints between the subject in the subject video 120 and the synthesized frames of an environment defined by the environment video 122. The video compositing service 116, in one or more implementations, preserves camera motion "$C_f$" from the subject video 120 "$V_f$" and synthesizes a frame sequence "$V_b$" of the scene captured by the environment video 122 "$V_b$" as the background layer with the same camera motion "$C_f$." The segmented subject from subject video 120 "$V_f$" is then alpha-blended with frame sequence "$V_b$'" with consistent camera motion to form the composite video 124. Further discussion of these and other examples is included in the following section and shown in corresponding figures.

In general, functionality, features, and concepts described in relation to the examples above and below are employed in the context of the example procedures described in this section. Further, functionality, features, and concepts described in relation to different figures and examples in this document are interchangeable among one another and are not limited to implementation in the context of a particular figure or procedure. Moreover, blocks associated with different representative procedures and corresponding figures herein are applicable together and/or combinable in different ways. Thus, individual functionality, features, and concepts described in relation to different example environments, devices, components, figures, and procedures herein are usable in any suitable combinations and are not limited to the particular combinations represented by the enumerated examples in this description.

Example Video Compositing use of Three Dimensional Awareness

Figure 2:
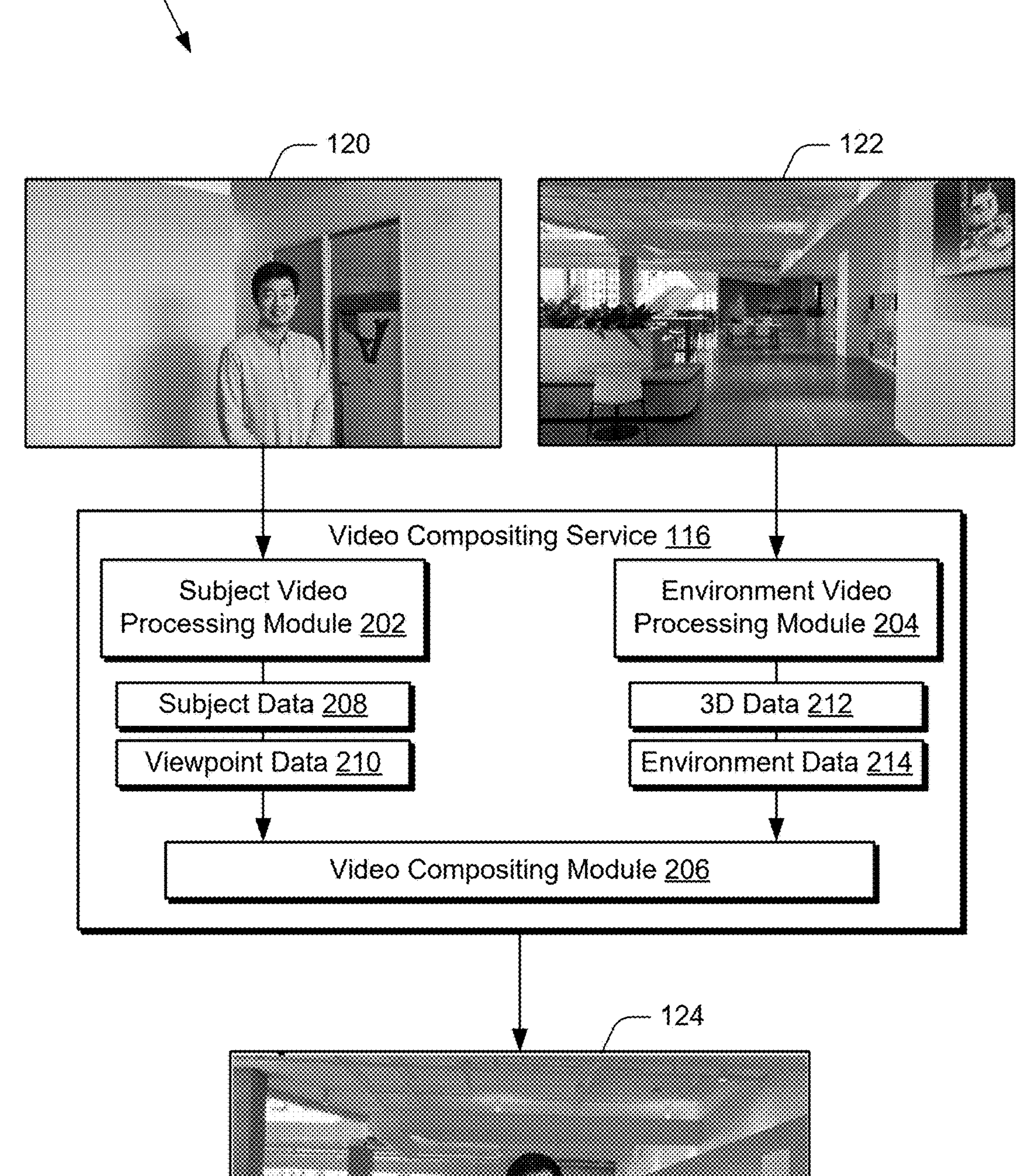
FIG. 2 depicts a system in an example implementation showing operation of a video compositing service of FIG. 1 in greater detail.

FIG. 2 depicts a system 200 in an example implementation showing operation of the video compositing service 116 of FIG. 1 in greater detail. The video compositing service 116 is configurable to implement a pipeline to address technical challenges in support of free camera movement and synchronization in video compositing. To do so, the video compositing service 116 employs a subject video processing module 202, an environment video processing module 204, and a video compositing module 206.

The subject video processing module 202 is configured to process the subject video 120 to form subject data 208 and viewpoint data 210. The environment video processing module 204 is configured to process the environment video 122 to generate 3D data 212 and environment data 214. Outputs of the subject video processing module 202 and the environment video processing module 204 are then received as inputs by the video compositing module 206 to generate the composite video 124.

The subject video processing module 202, for instance, is configured to segment a subject from the subject video 120 to form the subject data 208, e.g., as one or more masks. The subject video processing module 202 is also configured to generate viewpoint data 210 based on viewpoints within respective frames of the subject video 120. Examples of which include extracting camera motion "$C_f$" and estimating per-frame depth of subject video 120 "$V_f$" as further described in relation to FIG. 3.

The environment video processing module 204 is configured to generate 3D data 212 as a three-dimensional representation of an environment depicted in the environment video 122. Environment data 214 is also generated by the environment video processing module 204, e.g., per-frame camera parameters and a point cloud as further described in relation to FIG. 4.

The video compositing module 206 is then employed to render an environment of the environment video 122 based on the 3D data 212 based on the FIG. 1 extracting camera motion "$C_f$" from the viewpoint data 210 of the subject video 120. The video compositing module 206 is also configured to employ appearance harmonization by color tuning. Application of visual effects is also supported. Examples of which include reconstructing a subject to add shadow effects, using rendered depth from the 3D data 212 as blur map to apply lens blur effects, using rendered depth from the 3D data 212 as occlusion map for occlusion effects, and so on as further described in relation to FIG. 5.

In comparison with conventional techniques, the video compositing service 116 exhibits improved performance and supports synthesis of novel views even in scenarios involving relatively large change in viewpoints, e.g., camera motions. Further, the 3D data 212 is reusable as an asset in support of other compositing scenarios, as the 3D data 212 supports rendering with arbitrary camera motion without addition training.

Figure 3:
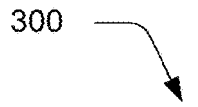
FIG. 3 depicts a system in an example implementation showing operation of a subject video processing module of the video compositing service of FIG. 2 in greater detail.
Figure 3:
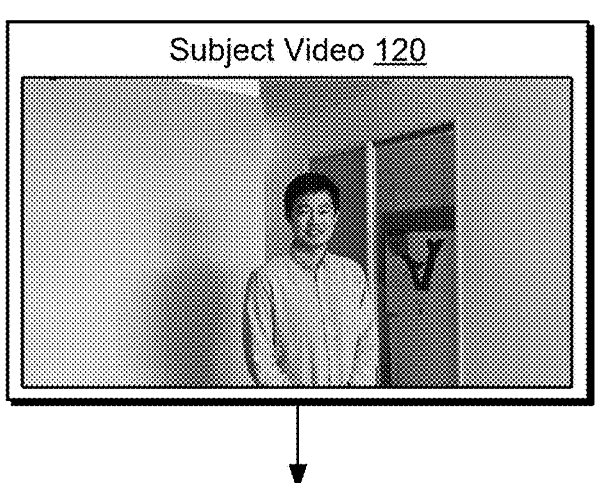
Figure 3:
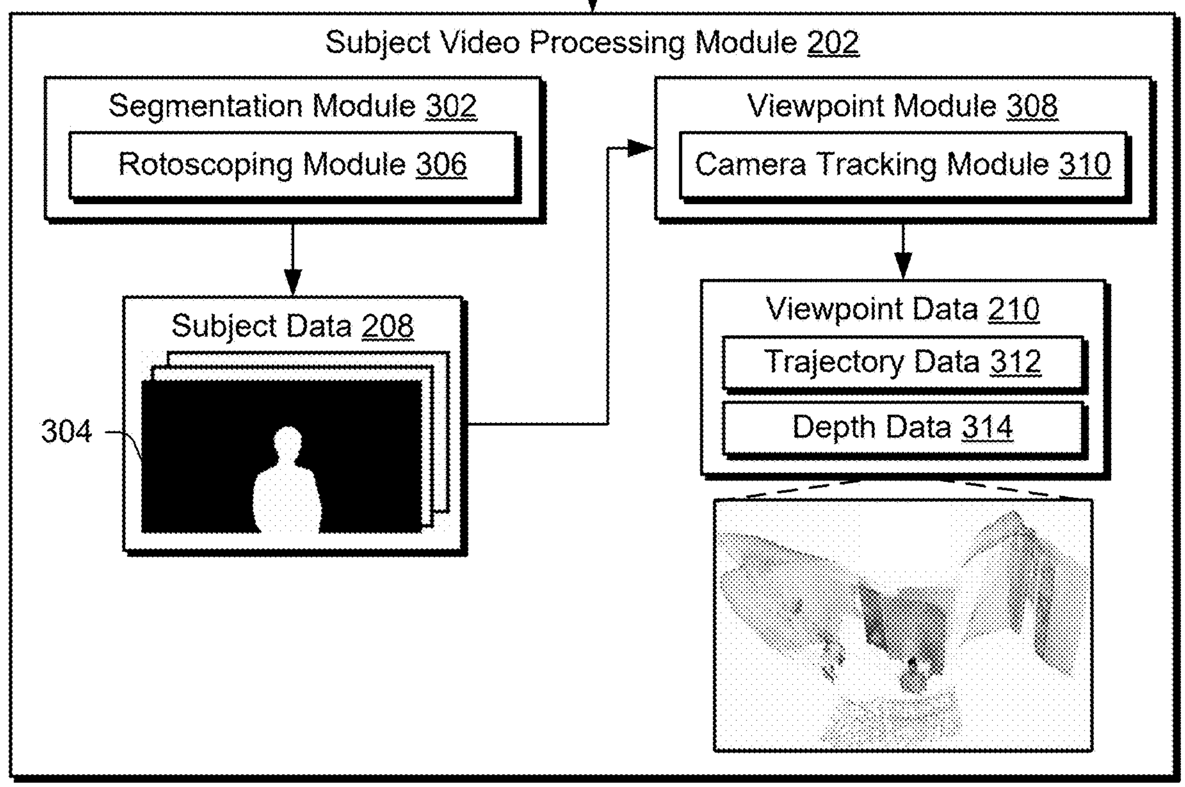

FIG. 3 depicts a system 300 in an example implementation showing operation of the subject video processing module 202 of the video compositing service 116 of FIG. 2 in greater detail. The subject video processing module 202 includes a segmentation module 302 that is configured to generate the subject data 208 as segmenting a subject from the subject video 120, e.g., into masks 304 for respective frames of the subject video 120. A variety of techniques are usable to do so, an example of which is referred to as "rotoscoping" as represented by a rotoscoping module 306 of the segmentation module 302.

Rotoscoping refers to a technique for semi-supervised video object segmentation in which memory networks are used such that past frames with object masks form an external memory and a current frame as a query is segmented based at least in part on mask information in the memory. The query and memory, for instance, are densely matched in a feature space to cover space/time pixel locations in a feed-forward manner and addresses technical challenges such as appearance changes and occlusions. Further discussion of rotoscoping techniques may be found at Seoung Wug Oh, Joon-Young Lee, Ning Xu, and Seon Joo Kim. "Video Object segmentation using space-time memory networks." In ICCV, October 2019, the entire disclosure of which is hereby incorporated by reference.

The subject video 120, for instance, is definable as:

$$V_f = \{I_f^i, i \in [0, t]\}$$

where $$“I_f^i”$$

is the "i-th" frame in subject video 120 "$V_f$". The subject data 208 is configurable as masks 304 (e.g., binary masks) as follows:

$$M = \{M_f^i, i \in [0, t]\}$$

where $$“M_f^i”$$

is a binary mask, $$“M_f^i(p) = 1”$$

if "p∈subject," otherwise "0."

A viewpoint module 308 is then employed to generate the viewpoint data 210 in support of viewpoint motion synchronization. The viewpoint module 308, for instance, includes a camera tracking module 310 to generate trajectory data 312 describing a trajectory of a viewpoint between respective frames of the subject video 120 and depth data 314 describing a depth of a subject in respective frames at respective viewpoints.

The trajectory data 312, for instance, is definable as a camera trajectory "$C_f$" and the depth data 314 as per-frame depth $$\text{“}D_f = \{D_f^i,\ i \in [0, t]\}\text{”}$$

from the subject video 120 "$V_f$." The trajectory data 312 (e.g., camera trajectory "$C_f$") is usable to define respective portions of an environment to be rendered from the environment video 122. The per-frame depth "$D_f$" is usable as a three-dimensional proxy of the subject video 120 "$V_f$" in support of alignment with the three dimensional environment of the environment video 122 as defined by the 3D data 212 as further described in relation to FIG. 4.

The camera tracking module 310 is configurable to employ a variety of techniques in generating the viewpoint data 210. An example of which takes as an input the masks 304 of the subject data 208 to initialize uncertainty maps. Further description is included by Zhoutong Zhang, Forrester Cole, Zhengqi Li, Michael Rubinstein, Noah Snavely, and William T. Freeman. "Structure and motion from casual videos." In ECCV, 2022, the entire disclosure of which is hereby incorporated by reference in its entirety.

Figure 4:
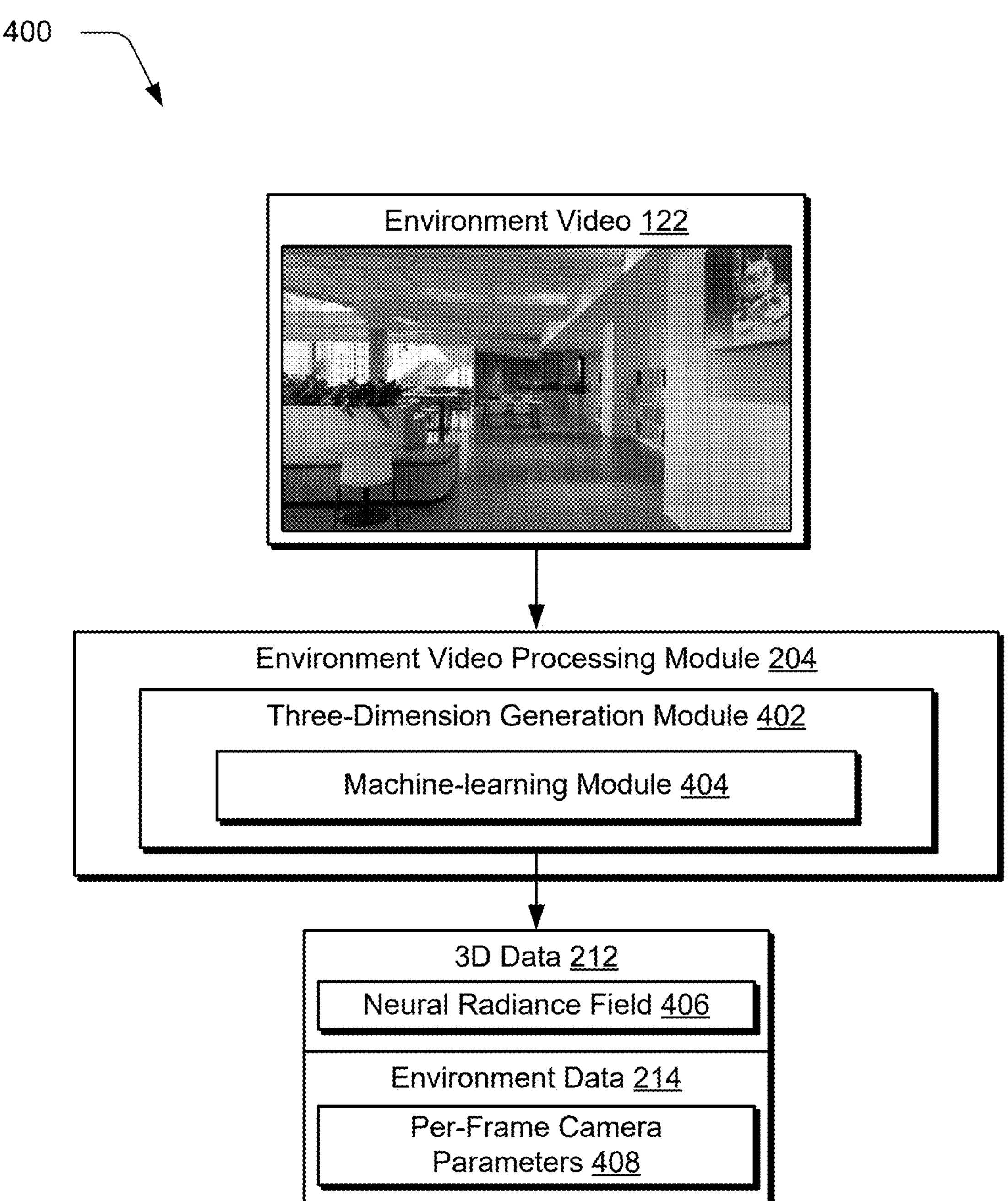
FIG. 4 depicts a system in an example implementation showing operation of an environment video processing module of the video compositing service of FIG. 2 in greater detail.

FIG. 4 depicts a system 400 in an example implementation showing operation of the environment video processing module 204 of the video compositing service 116 of FIG. 2 in greater detail. The environment video processing module 204 includes a three-dimension generation module 402 that is configured to generate 3D data 212 from two-dimensional frames of the environment video 122, e.g., using a machine-learning module 404.

An example of the 3D data 212 is represented as a neural radiance field 406. The neural radiance field 406 functions as a three-dimensional representation of the environment depicted in the environment video 122. The neural radiance field 406, for instance, is generated using a technique to represent the environment using a neural network, e.g., a fully-connected (non-convolutional) deep network that accepts inputs of spatial locations and viewpoints. Views of the environment may then be synthesized by querying the spatial locations along respective viewpoints using volume rendering techniques. An example of implementation and use of a neural radiance field 406 is further described by Ben Mildenhall, Pratul P. Srinivasan, Matthew Tancik, Jonathan T. Barron, Ravi Ramamoorthi, and Ren Ng. "Nerf: Representing scenes as neural radiance fields for view synthesis." In ECCV, 2020, the entire disclosure of which is hereby incorporated by reference. The neural radiance field 406 is configurable to store 3D assets defining appearance information of the environment video 122. The neural radiance field 406, as a trained machine-learning model, is also reusable in support of additional compositing scenarios (e.g., with different subject video 120) having different trajectories of viewpoint movements.

Outputs of the three-dimension generation module 402 also include environment data 214, examples of which include per-frame camera parameters 408 and a point cloud 410. The per-frame camera parameters 408 are represented as $$\text{“}C_b = \{C_b^i,\ i \in [0, t]\}.\text{”}$$

The point cloud 410 provides a sparse reconstruction of the environment "Pb" defined by frames of the environment video 122.

Figure 5:
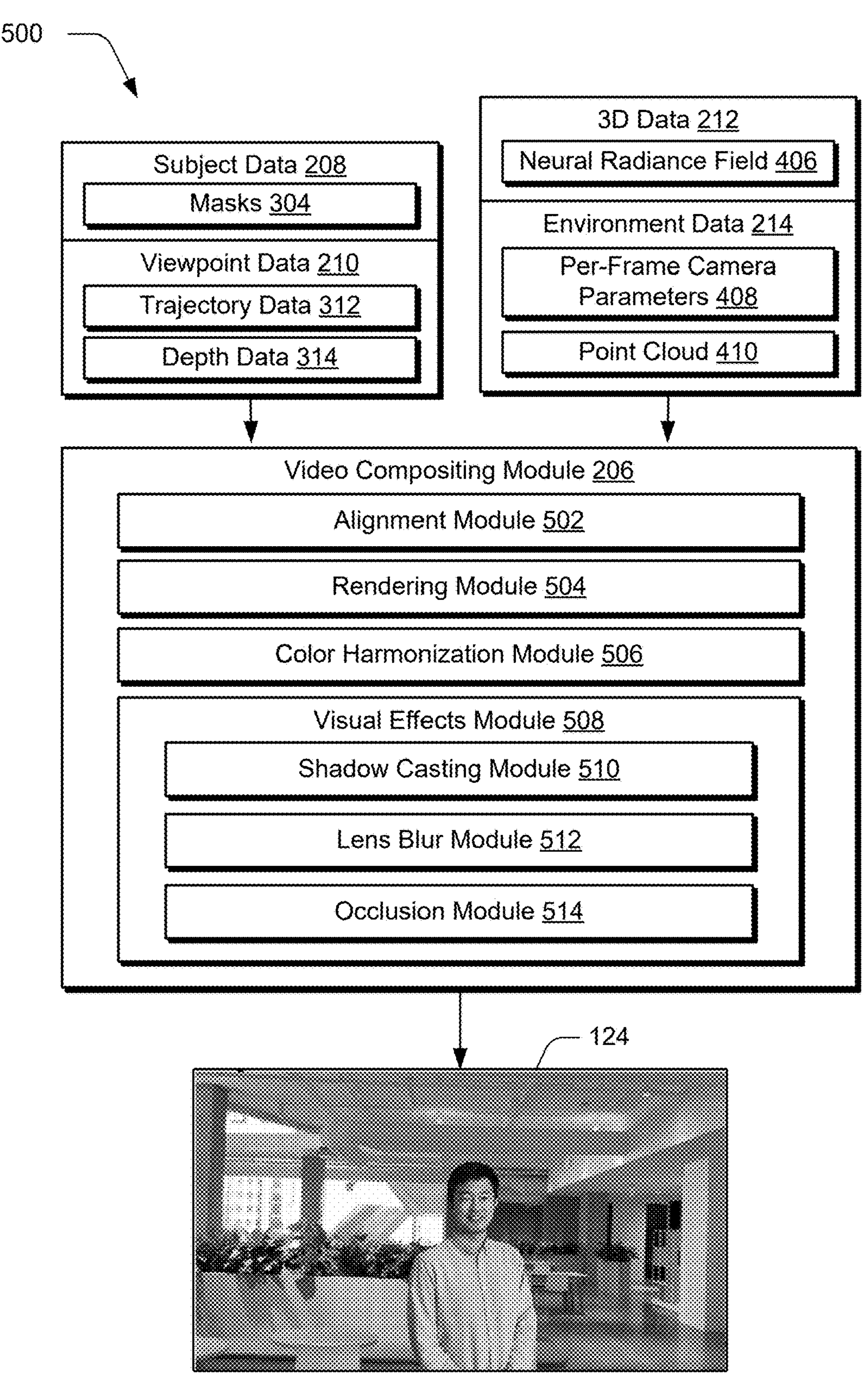
FIG. 5 depicts a system in an example implementation showing operation of a video compositing module of the video compositing service of FIG. 2 in greater detail.

FIG. 5 depicts a system 500 in an example implementation showing operation of the video compositing module 206 of the video compositing service 116 of FIG. 2 in greater detail. The video compositing module 206 receives as inputs the subject data 208 having the masks 304 and viewpoint data 210 which includes the trajectory data 312 and the depth data 314 generated from the subject video 120. The video compositing module 206 also receives, as inputs, the 3D data 212 including the neural radiance field 406 as well as environment data 214, examples of which include the per-frame camera parameters 408 and point cloud 410.

The video compositing module 206 begins by aligning the environment extracted from the environment video 122 as the neural radiance field 406 with an environment of the subject video 120 using an alignment module 502, i.e., to align respective world spaces. In the following discussion, an environment of the subject video 120 is referred to as "$W_f$" (i.e., world space of the foreground) and the environment of the environment video 122 is referred to as "$W_b$," i.e., world space of the background.

The alignment module 502 is configured to perform the alignment in three dimensions. The environment of the subject video 120 "$W_f$" is representable as a point cloud $$\text{“}P_f^k\text{”}$$

from "k" selected key frames obtained from corresponding depth maps $$\text{“}D_f^k.\text{”}$$

The environment of the environment video 122 "$W_b$" as sparse point cloud "$P_b$." A transformation is interactively created as:

$$\mathcal{T} = \{t_{f2b} \in \mathbb{R}^3, R_{f2b} \in \mathbb{R}^3, s_{f2b} \in \mathbb{R}^1\}$$

in which "T" is applied to point cloud $$\text{“}P_f^k\text{”}$$

from the environment of the subject video 120 as a transform to a corresponding location in the environment of the environment video 122 "$W_b$."

Under a weakly perspective assumption, given "T" and camera pose $$\text{“}C_f^i = [R_f^i \mid t_f^i],\text{”}$$

the transformation of $$\text{“}C_f^i\text{”}$$

is calculable as:

$$[U, S, V] = SVD\,(H) = SVD\left(t_f^i R_f^i s_{f2b}^{-1} R_{f2b}^{-1} t_{f2b}^{-1}\right)$$

$$R' = VU^T,\ t' = (R')^{-1} H,\ \mathcal{T}' = \left[R' | t'\right]$$

In the above expression, SVD decomposition is employed to disentangle rotation and translation from a compositional transformation "H." The transformed camera trajectory $$\text{“}C_f' = T^{\text{'}} C_f'\text{”}$$

is adopted as a viewpoint to render a model defined by the neural radiance field 406 by a rendering module 504 to synthesize a scene sequence $$\text{“}V_b'\text{”}$$

of frames that follow a trajectory of a viewpoint (e.g., camera motion) exhibited by the subject video 120.

Figure 6:
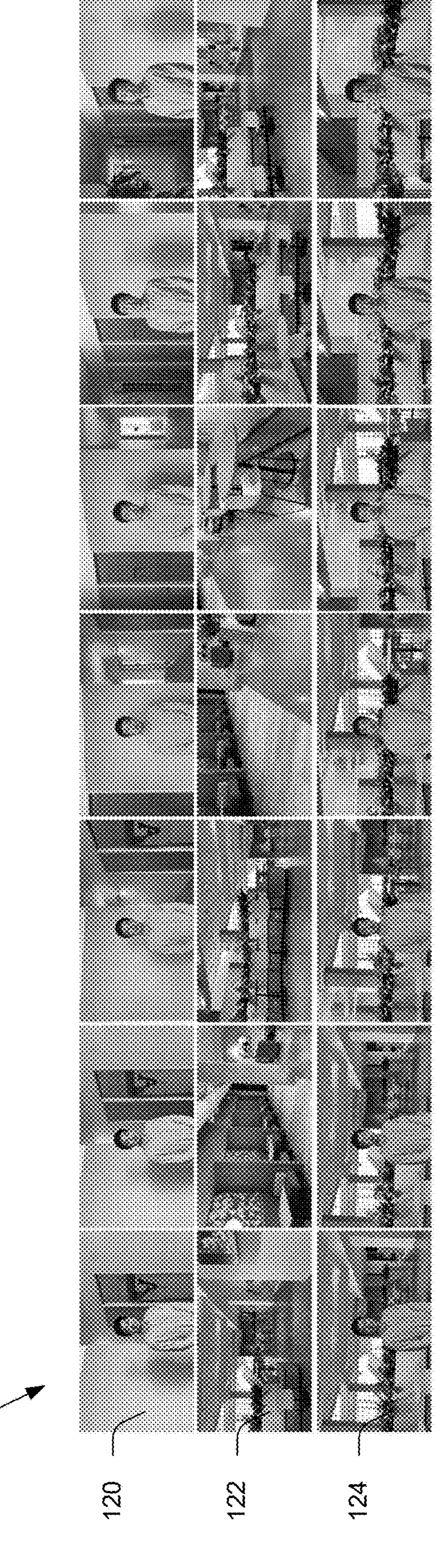
FIG. 6 depicts an example implementation showing sequences of frames corresponding to a subject video, an environment video, and a composite video.

FIG. 6 depicts an example implementation 600 showing sequences of frames corresponding to a subject video 120, an environment video 122, and a composite video 124. As shown, the viewpoint of the composite video 124 is configured to follow movement of a viewpoint of the subject video 120 and is independent of a viewpoint of the environment video 122. The environment video 122 is usable as a basis to define the environment. Therefore, in operation the environment video 122 may be formed by "looking around" the environment without synchronization with the subject video 120, which is not possible in conventional techniques.

Returning again to FIG. 5, the video compositing module 206 is also configurable to employ color harmonization as part of generating the composite video 124, functionality of which is represented as a color harmonization module 506. Given the synthesized scene sequence $$\text{“}V_b'\text{”}$$

of frames from the composite video 124, the subject video 120 "$V_f$," and masks 304 of the subject data 208 "$M_f$," alpha blending is usable by the rendering module 504 to composite the subject from the subject video 120 with an environment from the environment video 122.

However, color discrepancies may occur between the subject and the environment. To address this technical challenge, the color harmonization module 506 is employed to implement an interactive curve-based color tuning technique in support of user inputs to match color as a post-processing step after the rendering by the rendering module 504.

The video compositing module 206 is also configurable to employ a visual effects module 508 in support of a variety of visual effects. Examples of visual effects include shadow casting as represented by a shadow casting module 510, lens blur as implemented by a lens blur module 512, and occlusion as implemented by an occlusion module 514.

Shadow synthesis is utilized by the shadow casting module 510 to increase realism. When the composite video 124 involves contact between the subject and the environment (e.g., a full-body human walking on the ground), use of shadow supports a visual cue of contact between the entities. To synthesize the shadow, 3D geometry of the subject is generated by the shadow casting module 510, e.g., based on the masks 304 of the subject data 208.

Given an image of a full-body human, for instance, the shadow casting module 510 generates corresponding human mesh and viewpoints. By applying the technique iteratively to each of the frames of the subject video 120, the shadow casting module 510 generates a sequence of human meshes across the time. The shadow casting module 510 is configurable to support user inputs to set a directional light in 3D space and define a ground plane to "catch" the shadow. Shadows are savable by the shadow casting module 510 as a separate layer that is usable as part of final compositing by the video compositing module 206.

Lens blur is an effect is which focus is given by the lens blur module 512 to a particular portion of an image (e.g., the subject) and other portions of the image are defocused through use of blur. The lens blur module 512, for instance, is configured to generate rays from a camera based on the neural radiance field 406 to each of the pixels in a target frame. Density is then integrated by the lens blur module 512 along each ray to generate a depth value for that pixel which is usable as a depth map and subsequently a blur map, e.g., to blur based on depth in a depicted environment.

Another scenario involving subject/environment interaction is occlusion, functionality of which is represented by the occlusion module 514. In some use cases, a subject is to exhibit movement between objects in an environment of the environment video 122. The 3D data 212 of the environment is therefore usable by the occlusion module 514 to generate an occlusion mask to exhibit this movement. According to a reconstructed depth of the environment, for instance, the occlusion module 514 defines a plane indicating the space where the subject is to exhibit movement. When rendering the depth of the scene, the occlusion module 514 compares the depth of the environment with the depth of the plane at each pixel as a technique to distinguish whether a part of the scene is in front or behind of the subject and therefore control "what" is rendered. Other visual effects as implemented by the video compositing module 206 are also contemplated.

Example Video Compositing Procedures

The following discussion describes techniques that are implementable utilizing the described systems and devices. Aspects of each of the procedures are implemented in hardware, firmware, software, or a combination thereof. The procedures are shown as a set of blocks that specify operations performable by hardware and are not necessarily limited to the orders shown for performing the operations by the respective blocks. Blocks of the procedures, for instance, specify operations programmable by hardware (e.g., processor, microprocessor, controller, firmware) as instructions thereby creating a special purpose machine for carrying out an algorithm as illustrated by the flow diagram. As a result, the instructions are storable on a computer-readable storage medium that causes the hardware to perform the algorithm, e.g., responsive to execution of the instructions. In portions of the following discussion, reference will be made to FIGS. 1-6.

Figure 7:
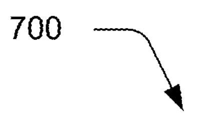
FIG. 7 is a flow diagram depicting an algorithm as a step-by-step procedure in an example implementation of operations performable for accomplishing a result of three dimensional aware video compositing.

FIG. 7 is a flow diagram depicting an algorithm 700 as a step-by-step procedure in an example implementation of operations performable for accomplishing a result of three dimensional aware video compositing. To begin in this example, subject data 208 is produced by a subject video processing module 202. The subject data 208 defines a subject depicted in frames of a subject video 120 and viewpoint data 210 describing movement of a viewpoint with respect to the frames of the subject video (block 702).

Three-dimensional data (e.g., 3D data 212) is formed by an environment video processing module 204. The 3D data 212 defines a three-dimensional representation of an environment depicted in frames of an environment video (block 704).

A composited video 124 is generated by a video compositing module 206 by aligning the environment with the movement of the viewpoint of the subject based on the subject data and the three-dimensional data (block 706). The composited video is then rendered (block 708), e.g., presented for display in a user interface.

Example System and Device

Figure 8:
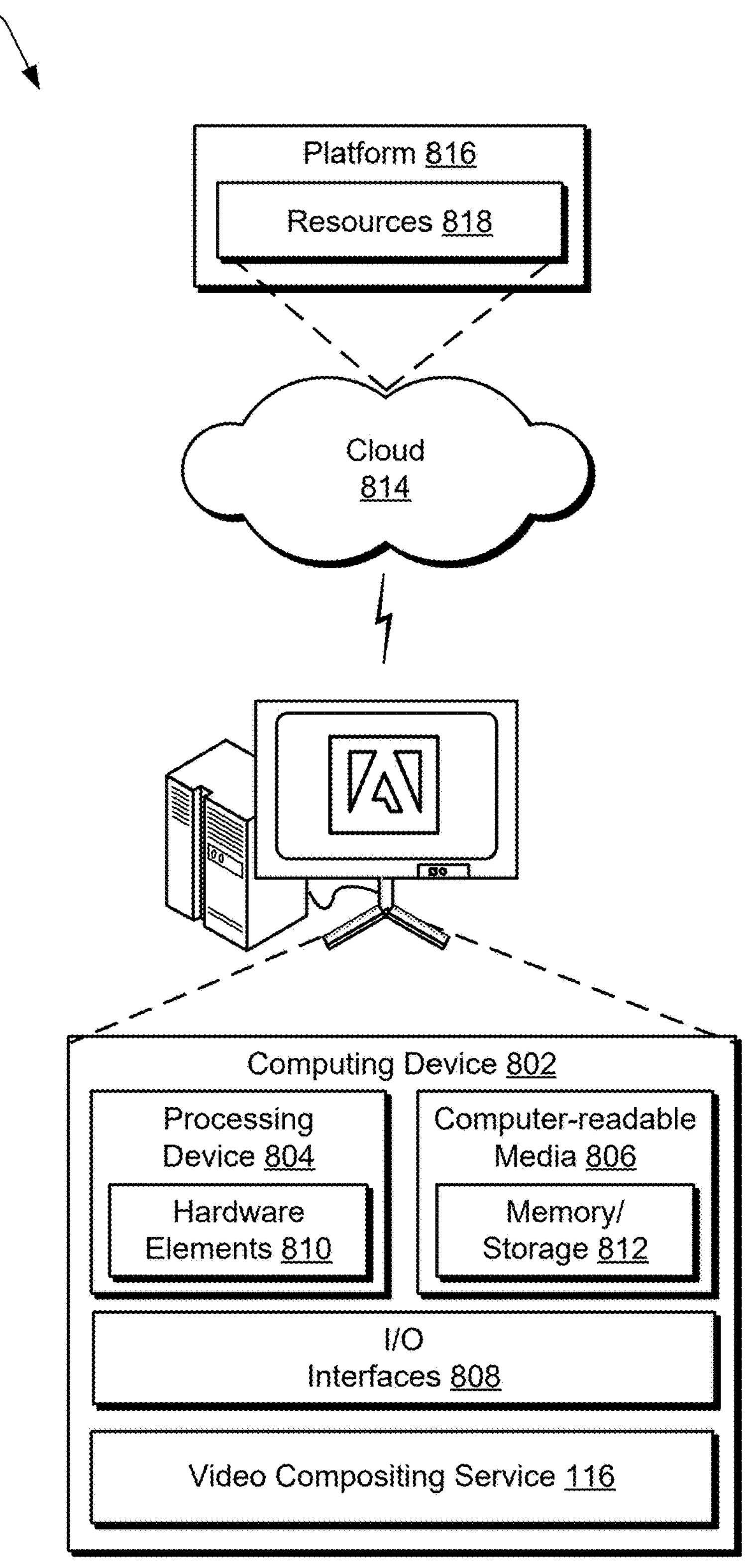
FIG. 8 illustrates an example system including various components of an example device that can be implemented as any type of computing device as described and/or utilize with reference to the previous figures to implement embodiments of the techniques described herein.

FIG. 8 illustrates an example system generally at 800 that includes an example computing device 802 that is representative of one or more computing systems and/or devices that implement the various techniques described herein. This is illustrated through inclusion of the video compositing service 116. The computing device 802 is configurable, for example, as a server of a service provider, a device associated with a client (e.g., a client device), an on-chip system, and/or any other suitable computing device or computing system.

The example computing device 802 as illustrated includes a processing device 804, one or more computer-readable media 806, and one or more I/O interface 808 that are communicatively coupled, one to another. Although not shown, the computing device 802 further includes a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing device 804 is representative of functionality to perform one or more operations using hardware. Accordingly, the processing device 804 is illustrated as including hardware element 810 that is configurable as processors, functional blocks, and so forth. This includes implementation in hardware as an application specific integrated circuit or other logic device formed using one or more semiconductors. The hardware elements 810 are not limited by the materials from which they are formed or the processing mechanisms employed therein. For example, processors are configurable as semiconductor(s) and/or transistors (e.g., electronic integrated circuits (ICs)). In such a context, processor-executable instructions are electronically-executable instructions.

The computer-readable storage media 806 is illustrated as including memory/storage 812 that stores instructions that are executable to cause the FIG. 1 processing device 804 to perform operations. The memory/storage 812 represents memory/storage capacity associated with one or more computer-readable media. The memory/storage 812 includes volatile media (such as random access memory (RAM)) and/or nonvolatile media (such as read only memory (ROM), Flash memory, optical disks, magnetic disks, and so forth). The memory/storage 812 includes fixed media (e.g., RAM, ROM, a fixed hard drive, and so on) as well as removable media (e.g., Flash memory, a removable hard drive, an optical disc, and so forth). The computer-readable media 806 is configurable in a variety of other ways as further described below.

Input/output interface(s) 808 are representative of functionality to allow a user to enter commands and information to computing device 802, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., employing visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 802 is configurable in a variety of ways as further described below to support user interaction.

Various techniques are described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques are configurable on a variety of commercial computing platforms having a variety of processors.

An implementation of the described modules and techniques is stored on or transmitted across some form of computer-readable media. The computer-readable media includes a variety of media that is accessed by the computing device 802. By way of example, and not limitation, computer-readable media includes "computer-readable storage media" and "computer-readable signal media."

"Computer-readable storage media" refers to media and/or devices that enable persistent and/or non-transitory storage of information (e.g., instructions are stored thereon that are executable by a processing device) in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media include but are not limited to RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and are accessible by a computer.

"Computer-readable signal media" refers to a signal-bearing medium that is configured to transmit instructions to the hardware of the computing device 802, such as via a network. Signal media typically embodies computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 810 and computer-readable media 806 are representative of modules, programmable device logic and/or fixed device logic implemented in a hardware form that are employed in some embodiments to implement at least some aspects of the techniques described herein, such as to perform one or more instructions. Hardware includes components of an integrated circuit or on-chip system, an application-specific integrated circuit (ASIC), a field-programmable gate array (FPGA), a complex programmable logic device (CPLD), and other implementations in silicon or other hardware. In this context, hardware operates as a processing device that performs program tasks defined by instructions and/or logic embodied by the hardware as well as a hardware utilized to store instructions for execution, e.g., the computer-readable storage media described previously.

Combinations of the foregoing are also be employed to implement various techniques described herein. Accordingly, software, hardware, or executable modules are implemented as one or more instructions and/or logic embodied on some form of computer-readable storage media and/or by one or more hardware elements 810. The computing device 802 is configured to implement particular instructions and/or functions corresponding to the software and/or hardware modules. Accordingly, implementation of a module that is executable by the computing device 802 as software is achieved at least partially in hardware, e.g., through use of computer-readable storage media and/or hardware elements 810 of the processing device 804. The instructions and/or functions are executable/operable by one or more articles of manufacture (for example, one or more computing devices 802 and/or processing devices 804) to implement techniques, modules, and examples described herein.

The techniques described herein are supported by various configurations of the computing device 802 and are not limited to the specific examples of the techniques described herein. This functionality is also implementable all or in part through use of a distributed system, such as over a "cloud" 814 via a platform 816 as described below.

The cloud 814 includes and/or is representative of a platform 816 for resources 818. The platform 816 abstracts underlying functionality of hardware (e.g., servers) and software resources of the cloud 814. The resources 818 include applications and/or data that can be utilized while computer processing is executed on servers that are remote from the computing device 802. Resources 818 can also include services provided over the Internet and/or through a subscriber network, such as a cellular or Wi-Fi network.

The platform 816 abstracts resources and functions to connect the computing device 802 with other computing devices. The platform 816 also serves to abstract scaling of resources to provide a corresponding level of scale to encountered demand for the resources 818 that are implemented via the platform 816. Accordingly, in an interconnected device embodiment, implementation of functionality described herein is distributable throughout the system 800. For example, the functionality is implementable in part on the computing device 802 as well as via the platform 816 that abstracts the functionality of the cloud 814.

In implementations, the platform 816 employs a "machine-learning model" that is configured to implement the techniques described herein. A machine-learning model refers to a computer representation that can be tuned (e.g., trained and retrained) based on inputs to approximate unknown functions. In particular, the term machine-learning model can include a model that utilizes algorithms to learn from, and make predictions on, known data by analyzing training data to learn and relearn to generate outputs that reflect patterns and attributes of the training data. Examples of machine-learning models include neural networks, convolutional neural networks (CNNs), long short-term memory (LSTM) neural networks, decision trees, and so forth.

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:

producing, by a processing device, subject data defining a subject depicted in frames of a subject video and viewpoint data describing movement of a viewpoint with respect to the frames of the subject video;

forming, by the processing device using a machine-learning model, three-dimensional data defining a three-dimensional representation of an environment depicted in frames of an environment video;

generating, by the processing device, a composited video by aligning the environment with the movement of the viewpoint of the subject based on the subject data and the three-dimensional data; and rendering, by the processing device, the composited video.

2. The method as described in claim 1, wherein the viewpoint data includes trajectory data associated with the viewpoint and depth data defining a depth of the subject of in respective frames of the subject video.

3. The method as described in claim 1, wherein the viewpoint data is configured to segment the subject from the frames of the subject video using one or more masks.

4. The method as described in claim 1, wherein the three-dimensional data is configured as a neural radiance field.

5. The method as described in claim 4, wherein the neural radiance field is generated using the machine-learning model as the three-dimensional representation of the environment.

6. The method as described in claim 1, wherein the forming includes forming parameters of environment data, the parameters including per-frame camera parameters or a point cloud.

7. The method as described in claim 1, wherein the generating includes harmonizing one or more colors of the subject with one or more colors of the environment.

8. The method as described in claim 1, wherein the generating includes compositing the subject with the environment using alpha blending.

9. The method as described in claim 1, wherein the generating includes applying one or more visual effects.

10. The method as described in claim 9, wherein the visual effects include shadow casting, lens blur, or occlusion.

11. A computing device comprising:

a processing device; and a computer-readable storage medium storing instructions that, responsive to execution by the processing device, causes the processing device to perform operations including:

producing subject data defining a subject and a trajectory with respect to frames of a subject video;

forming a neural radiance field configured as a trained model using machine learning as a three-dimensional representation of an environment depicted in frames of an environment video; and generating a composited video of the subject from the subject video and the environment from the environment video by rendering the neural radiance field based on the trajectory.

12. The computing device as described in claim 11, further comprising aligning the three-dimensional representation of the environment of the neural radiance field with respect to a three-dimensional environment of the subject video and wherein the generating is based, at least in part, on the aligning.

13. The computing device as described in claim 12, wherein the forming includes forming a point cloud based on the environment depicted in the frames of the environment video and the aligning is based on the point cloud.

14. The computing device as described in claim 13, wherein the producing includes producing depth data defining a depth of the subject in the frames of the subject video and the aligning is based on the point cloud and the depth data.

15. The computing device as described in claim 11, wherein the generating includes harmonizing one or more colors of the subject with one or more colors of the environment.

16. The computing device as described in claim 11, wherein the generating includes compositing the subject with the environment using alpha blending.

17. The computing device as described in claim 11, wherein the generating includes applying one or more visual effects, the visual effects including shadow casting, lens blur, or occlusion.

18. One or more computer-readable storage media storing instructions that, responsive to execution by a processing device, causes the processing device to perform operations comprising:

generating a composite video using a machine-learning model by synchronizing movement of a viewpoint in relation to a subject captured in a subject video with a three-dimensional representation of an environment generated from an environment video, the synchronizing based on:

depth data defining a depth of the subject in frames of the subject video; or extracting viewpoint motion from the subject video and using that motion to render the environment.

19. The one or more computer-readable media as described in claim 18, wherein the three-dimensional representation is configured as a neural radiance field.

20. The one or more computer-readable media as described in claim 19, wherein the neural radiance field is configured as a trained model using machine learning.

* * * * *